(12) United States Patent
Moinuddin et al.

(10) Patent No.: US 11,329,705 B1
(45) Date of Patent: May 10, 2022

(54) LOW-COMPLEXITY ROBUST BEAMFORMING FOR A MOVING SOURCE

(71) Applicant: KING ABDULAZIZ UNIVERSITY, Jeddah (SA)

(72) Inventors: Muhammad Moinuddin, Jeddah (SA); Ubaid M. Al-Saggaf, Jeddah (SA); Maaz Mahadi, Jeddah (SA); Tarig Ballal Ahmed, Thuwal (SA); Tareq Y. Al-Naffouri, Thuwal (SA)

(73) Assignee: KING ABDULAZIZ UNIVERSITY, Jeddah (SA)

( * ) Notice: Subject to any disclaimer, the term of this patent is extended or adjusted under 35 U.S.C. 154(b) by 0 days.

(21) Appl. No.: 17/386,432

(22) Filed: Jul. 27, 2021

(51) Int. Cl.
H04B 7/06 (2006.01)

(52) U.S. Cl.
CPC .................. H04B 7/0617 (2013.01)

(58) Field of Classification Search
CPC .................................... H04B 7/0617
See application file for complete search history.

(56) References Cited

U.S. PATENT DOCUMENTS

| | | | |
|---|---|---|---|
| 6,482,160 B1 * | 11/2002 | Stergiopoulos | G01S 15/8927 600/443 |
| 7,084,812 B2 | 8/2006 | Xin | |
| 7,536,029 B2 | 5/2009 | Choi et al. | |
| 8,754,810 B2 | 6/2014 | Guo et al. | |
| 9,312,929 B2 | 4/2016 | Forenza et al. | |
| 9,338,551 B2 | 5/2016 | Thyssen et al. | |
| 9,502,021 B1 | 11/2016 | Kleijn | |
| 9,584,909 B2 | 2/2017 | Heusdens et al. | |
| 9,800,316 B2 | 10/2017 | Woodsum | |
| 9,952,307 B2 | 4/2018 | Gan | |
| 10,141,993 B2 | 11/2018 | Lee et al. | |
| 2002/0152253 A1 * | 10/2002 | Ricks | H03H 21/0012 708/520 |
| 2005/0254347 A1 * | 11/2005 | Beaucoup | H04R 1/406 367/138 |
| 2008/0181174 A1 | 7/2008 | Cho | |
| 2010/0232531 A1 * | 9/2010 | Nam | H04L 25/0248 375/267 |

(Continued)

FOREIGN PATENT DOCUMENTS

| | | |
|---|---|---|
| CN | 105681972 A | 6/2016 |
| CN | 106782590 B | 10/2020 |

OTHER PUBLICATIONS

W. Chen and X. Huang, "Wavelet-based beamforming for high-speed rotating acoustic source," IEEE Access, vol. 6, pp. 10 231-10 239, 2018.

(Continued)

*Primary Examiner* — Kenneth T Lam
(74) *Attorney, Agent, or Firm* — WC&F IP

(57) ABSTRACT

Beamformers and beamforming methods involve diagonal loading (regularization). Significant features include the automatic determination of the regularization parameter using a linearly constrained minimum power (LCMP) bounded perturbation regularization (BPR) approach. More specifically, the method has the advantage of efficient beamforming when the desired signal is from a moving source. After determining an initial regularization parameter, each data window (i.e., snapshot) uses the regularization parameter of the prior window to recursively determine the next regularization parameter.

4 Claims, 7 Drawing Sheets

(56) References Cited

U.S. PATENT DOCUMENTS

2020/0191943 A1* 6/2020 Wu .................. G01S 13/003
2021/0109232 A1* 4/2021 Kassas ................ G01S 19/22

OTHER PUBLICATIONS

Q. Nengfeng, B. Ming, H. Xiaoqing, T. Zhuanxia, and G. Luyang, "Moving target beamforming based on bayesian method," in 2015 IEEE China Summit and International Conference on Signal and Information Processing (ChinaSIP). IEEE, 2015, pp. 393-397.

V. V. Zaharov, "Smart antenna beamforming algorithm for mobile communications with high speed moving sources," in 2008 IEEE Radio and Wireless Symposium. IEEE, 2008, pp. 279-282.

I. S. Yetik and A. Nehorai, "Beamforming using the fractional fourier transform," IEEE Transactions on Signal Processing, vol. 51, No. 6, pp. 1663-1668, 2003.

S. D. Somasundaram, N. H. Parsons, P. Li and R. C. De Lamare, "Reduced-dimension robust capon beamforming using krylov-subspace techniques," IEEE Transactions on Aerospace and Electronic Systems, vol. 51, No. 1, pp. 270-289, Jan. 2015.

K.-B. Yu, "Recursive updating the eigenvalue decomposition of a covariance matrix," IEEE Transactions on Signal Processing, vol. 39, No. 5, pp. 1136-1145, 1991.

T. Ballal, M. A. Suliman, and T. Y. Al-Naffouri, "Bounded perturbation regularization for linear least squares estimation," IEEE Access, vol. 5, pp. 27 551-27 562, 2017.

* cited by examiner

LOW-COMPLEXITY ROBUST BEAMFORMING FOR A MOVING SOURCE

FIELD OF THE INVENTION

The invention generally relates to array processing and, more particularly, beamforming for a moving radio frequency (RF) source.

BACKGROUND

Array processing has played a key role in many modern applications such as radar, sonar, radio astronomy, communications, and seismology. For example, antenna arrays are essential components in radar systems, while hydrophone arrays are widely used in sonar systems.

Beamforming, also known as spatial filtering, is a technique used in array processing to receive a signal radiating from a specific direction and suppress signals emerging from other directions. It is well known in the literature that beamforming performance degrades severely in the presence of steering vector errors. This is attributed to improper modeling, miscalibration, pointing error, and source motion. Hence, robust and adaptive techniques have been proposed to enhance beamforming performance. These methods include diagonal loading, multiple linear constraints, eigenspace projection, and the robust Capon beamformers (RCBs) that use ellipsoidal uncertainty sets of the steering vector.

New problems arise when beamforming for moving sources. In addressing the problem of beamforming for moving sources, work thus far has primarily considered acoustic applications. Little effort has been directed at improving beamforming for moving radio frequency (RF) sources, and acoustic solutions do not necessarily translate to RF solutions. Acoustic signals are wideband with no characteristic wavelength and time delays must be obtained by waveform interpolation. On the other hand, most of the RF signals of interest are narrowband signals with a well-defined nominal wavelength, and time delay can be compensated by a phase shift.

One example acoustic beamforming method is presented in W. Chen and X. Huang, "Wavelet-based beamforming for high-speed rotating acoustic source," IEEE Access, vol. 6, pp. 10 231-10 239, 2018. It is a wavelet-based beamforming method for rotating sources. Acoustic images are produced in the time-frequency domain as a result of direct incorporation of wavelet transform and the Doppler effect into Green's function. Beamforming is achieved as a simple inversion of time-frequency domain.

For RF applications, a Bayesian beamforming approach for a moving target is presented in Q. Nengfeng, B. Ming, H. Xiaoqing, T. Zhuanxia, and G. Luyang, "Moving target beamforming based on bayesian method," in 2015 IEEE China Summit and International Conference on Signal and Information Processing (ChinaSIP). IEEE, 2015, pp. 393-397. The optimal beamformers' coefficients for this technique is the sum of minimum variance distortionless response (MVDR) beamformer at the estimated direction of arrivals (DOAs) weighted by a posterior probability density function (PDF) of these DOAs. A particle filter is used to find this a posteriori PDF.

A sliding window modified loaded sample matrix inversion (LSMI) beamforming algorithm for high speed mobile sources was proposed in V. V. Zaharov, "Smart antenna beamforming algorithm for mobile communications with high speed moving sources," in 2008 IEEE Radio and Wireless Symposium. IEEE, 2008, pp. 279-282. The algorithm is based on recursive vector updating rather than matrix updating. For a sliding window of size K and antenna array of size N, the algorithm requires updating K vectors of size N, instead of K matrices of size N×N. However, this method uses a fixed diagonal loading method, which is not effective for a moving source beamforming.

Another proposed beamforming method is given in I. S. Yetik and A. Nehorai, "Beamforming using the fractional fourier transform," IEEE Transactions on Signal Processing, vol. 51, no. 6, pp. 1663-1668, 2003. This technique is based on Fractional Fourier transform (FrFT). The beamformer involves optimum FrFT order selection based on the strongest amplitude peak search. However, this search based method is computationally inefficient and not practical.

Other methods aim at reducing computational complexity in beamforming. For example, reduced-rank methods are used to provide fast convergence and reduce computational complexity of adaptive beamformers. These methods are based on projecting data onto a low rank subspace. One work proposes a Krylov-subspace based reduced-dimension robust Capon beamformers. S. D. Somasundaram, N. H. Parsons, P. Li, and R. C. de Lamare, "Reduced-dimension robust capon beamforming using krylov-subspace techniques," IEEE Transactions on Aerospace and Electronic Systems, vol. 51, no. 1, pp. 270-289, January 2015. Sensitivity to the signal of interest error (SOI) and array steering vector (ASV) errors is the main disadvantage of the Krylov-subspace methods.

SUMMARY

This disclosure provides a robust beamforming method where the steering vector is not known precisely due to source movement and direction of arrivals (DOA) estimation errors. An exemplary beamformer is based on loaded minimum variance distortionless response (MVDR) with data collection achieved by sliding the observation window to allow a new snapshot to enter and an old one to leave. This sliding-window process results in a slight change in the regularization (diagonal loading) parameter. Unlike the approach in the Zaharov paper identified in the Background section above, which utilizes a fixed regularization parameter, present embodiments exploit a sliding window setting to persistently update the regularization parameter, as will be explained in the Detailed Description section below.

DETAILED DESCRIPTION

Figure 1:
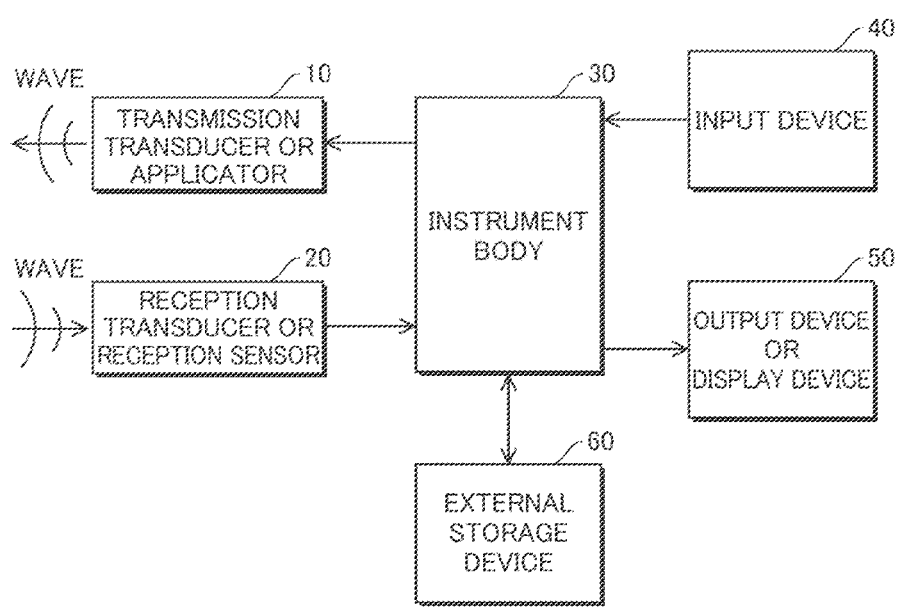
FIG. 1 is a schematic representation (block map) of a measurement and imaging instrument according to an exemplary embodiment.

FIG. 1 shows a schematic representation of an antenna array instrument. The instrument is equipped with a transmission transducer (or an applicator) 10, a reception transducer (or a reception sensor) 20, an instrument body 30, an input device 40, an output device (or a display device) 50, and an external storage (memory) device 60. The transmission transducer 10 and the reception transducer 20 may also be installed into one body or combined to realize a transmission and reception sensor (transceiver). The reception transducer 20 may comprise an array of reception antennas.

Figure 2:
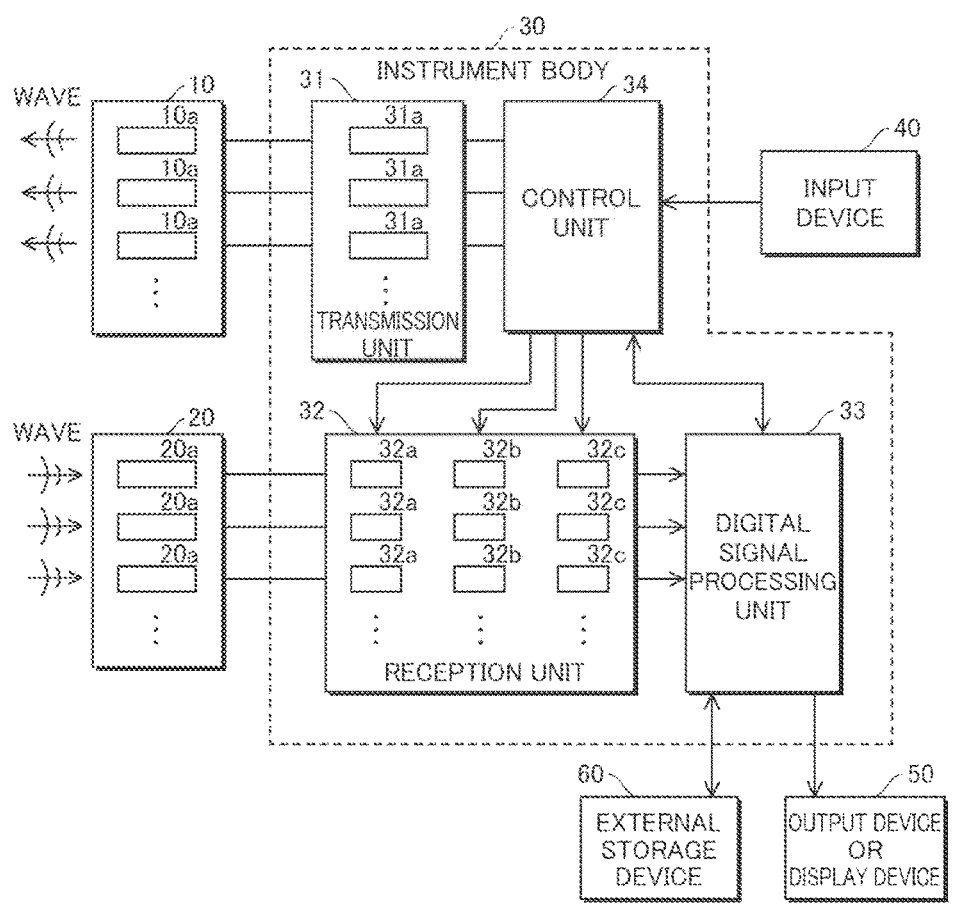
FIG. 2 is another schematic representation (block map) of the instrument shown in FIG. 1.

FIG. 2 shows a schematic representation of internal elements of the instrument of FIG. 1, especially of the instrument body 30. The instrument body 30 may be equipped with a transmission unit 31, a reception unit 32, a digital signal processing (DSP) unit 33, and a control unit 34. The transmission unit 31 and reception unit 32 are configured to respectively generate at least one driving signal and process at least one reception signal to realize a signal processing unit for generating wave data. The DSP unit 33 is configured for e.g. calculating a displacement vector by performing a displacement measurement method for wave signal data generated at at least two different temporal phases. The control unit 34 is configured for controlling the transmission unit 31 and the reception unit 32 for e.g. generating at least one steered wave electrically or mechanically (referred to as "steering beam") and scanning a measurement object in a lateral direction for generating wave signal data at least at the two different temporal phases. In some embodiments, the reception unit 32 may include the DSP unit 33. In FIGS. 1 and 2, communications among the above-mentioned elements or among the units in the instrument body 30 may be performed on the basis of a wire or wireless technology.

The frequencies, bandwidths, wave shapes, and directivities of received signals may be determined by the reception aperture elements 20*a* of reception transducer 20 and reception unit 32. The reception unit 32 includes receivers 32*a* with plural channels, AD convertors 32*b*, and memories (or storage devices, storage media) 32*c*. Arrival of waves to the reception aperture elements 20*a* generates the reception signals within the instrument. Reception signal characteristics may be determined by the geometries of the reception aperture elements 20*a* (thickness or aperture size and shape) and materials. Under the direction of control unit 34, the reception transducer 20 and/or reception unit 32 may perform processing that controls for reception of particular frequencies, bandwidths, wave shapes and directivities of received signals. Desired parameters may be set automatically via the control unit 34 or set using an input device 40.

Control signals (e.g., trigger signals) sent from the control unit 34 in the instrument body 30 may command the start of AD conversions at AD convertors 32*b* of the respective channels. According to the command signals, analog signals of respective channels are converted to digital signals which are stored in storage devices or storage media 32*c*. In some embodiments, one frame of received signals may be stored at a time and processed by the DSP unit 33 according to the discussion below. Control unit 34 may also change the transmission aperture position, the transmission effective aperture width, or the transmission steering directions.

Generally, the reception channel number is the number of communication lines that are used for performing one beamforming, to send waves (signals) received by the respective reception aperture elements 20*a* to the reception unit 32. The formations of reception channels are various. Generally, in order to perform one beamforming every time, received signals generated by plural reception aperture elements 20*a* are applied with different delays. That is, the reception unit 32 is equipped with analogue or digital delay patterns, and the delay patterns that realize reception focusings or steering directions, etc. can be used according to an operator's selection using the input device 40.

The digital signal processing (DSP) unit 33 is configured to perform beamforming processes with respect to the reception signals generated by transducer 20 and reception unit 32. The DSP unit 33 may also perform other processes such as a Hilbert transform, spectral frequency division, and superposition. The reception unit 32 may include the DSP unit 33, or the DSP unit 33 may include the reception unit 32. The control unit 34 may control the DSP unit 33 and other units by sending command signals. Alternatively, the control unit 34 may include the DSP unit 33, or else the DSP unit 33 may include the control unit 34.

The digital signal processing unit 33 may comprise one or more devices, calculators, PLDs (Programmable Logic Devices), FPGAs (Field-Programmable Gate Arrays), DSPs (Digital Signal Processors), GPUs (Graphical Processing Units), processors, and/or microprocessors.

Following is an explanation of an exemplary procedure and sub-procedures performed by, e.g., an instrument as depicted in FIGS. 1 and 2, particularly by a DSP unit 33.

A. Signal Model and MVDR Beamformer

Consider a moving source with angular motion described by the following equation:

$$\theta_t = \theta_o + \omega t, \tag{1}$$

where $\theta_t$(rad) is the position of the source at time t, $\theta_o$(rad) is its initial position, and $\omega$(rad/sec) is the angular velocity. Also consider a uniform linear array (ULA) of N elements receiving a signal from this moving source and Q signals from static interference sources. The N×1 complex array observation vector can be modeled as $$y_t = \beta_t a(\theta_t) s_t + v_t, \tag{2}$$

where $a(\theta_t)$ is the steering vector of the desired source $s_t$, the term $$v_t = \sum_{i=1}^{Q} a_i[t] s_i[t] + n[t] \in \mathbb{C}^N$$

is the sum of interference signals, $s_i[t]$, multiplied by their corresponding steering vectors, $a_i[t]$, and additive white Gaussian noise, $n[t]$. The variability in signal amplitude due to distance change is modeled using the scalar $\beta_t$. Throughout this disclosure, without loss of generality, the following exponential model for amplitude change is used:

$$\beta_t = e^{-\alpha t}, \tag{3}$$

where $\alpha \in \mathbb{R}$, $\alpha \geq 0$

The beamformer output at time t is given by $$x_t = w_t^H y_t, \tag{4}$$

where $w_t \in \mathbb{C}^N$ is the beamformer weighting coefficients at time t. For an MVDR beamformer, the weighting vector is found by solving the following optimization problem:

$$w_{opt}[t] = \underset{w_t}{\mathrm{argmin}} \, w_t^H R_t w_t \text{ s.t. } a_t^H w_t = 1, \quad (5)$$

where $R_t = \mathbb{E}[y_t y_t^H]$ is the covariance matrix, and $a_t = a(\theta_t) \in \mathbb{C}^N$ is the steering vector of the desired signal. The solution of the above optimization problem of Equation (5) is given by $$w_{opt}[t] = \frac{R_t^{-1} a_t}{a_t^H R_t^{-1} a_t}. \quad (6)$$

In practical applications, $R_t$ is unavailable; hence, it is replaced with an estimate $\hat{R}_t$ that is given by $$\hat{R}_t = \frac{1}{k} \sum_{t=1}^{K} y_t y_t^H, \quad (7)$$

where K is the number of snapshots.

B. Generalized Sidelobe Canceller (GSC)

An alternative formulation of Equation (5) is called the generalized sidelobe canceller (GSC). The GSC may be obtained by decomposing the weights w as follows:

$$w_t = w_q[t] - B_t w_a[t], \quad (8)$$

where $w_q[t] = a_t/N$ is a quiescent weight vector and $B_t \in \mathbb{C}^{N \times (N-1)}$ is a blocking matrix that is orthogonal to $a_t$, and is chosen such that $B_t^H B_t = I$. By substituting the decomposed $w_t$ of Equation (8) into Equation (5) and replacing $R_t$ with $\hat{R}_t$, the problem is reformulated as the following unconstrained least squares optimization:

$$\underset{w_a[t]}{\min} (B_t w_a[t] - w_q[t])^H \hat{R}_t (B_t w_a[t] - w_q[t]), \quad (9)$$

or $$\underset{w_a[t]}{\min} \|A_t w_a[t] - b_t\|^2, \quad (10)$$

where $$A_t \triangleq \hat{R}_t^{\frac{1}{2}} B_t \in \mathbb{C}^{N \times N-1}$$

and $$b_t \triangleq \hat{R}_t^{\frac{1}{2}} w_q[t].$$

The minimization of Equation (10) corresponds to the following linear regression model:

$$b_t = A_t w_a[t] + z_t, \quad (11)$$

where $z \in \mathbb{C}^N$ is an error vector. Since $$\hat{R}_t^{\frac{1}{2}}$$

is normally ill-conditioned, and $b_t$ is noisy, the application of regularization to estimate $w_a[t]$ is preferred. The regularized least squares (RLS) problem is stated as follows:

$$\underset{w_a[t]}{\min} \|A_t w_a[t] - b_t\|^2 + \gamma_t \|w_a[t]\|^2. \quad (12)$$

After choosing a proper value for $\gamma_t$, it is usable in the loaded version of Equation (6) that is given by $$w_{opt}[t] = \frac{(R_t + \gamma_t I)^{-1} a_t}{a_t^H (R_t + \gamma_t I)^{-1} a_t}. \quad (13)$$

C. Exemplary Method

In this subsection, the subscript t is eliminated for simplicity of notations. The regularization parameter, $\gamma$, is obtained by solving the following equation:

$$f(\gamma) = tr\left[\left(\sum^2 + \gamma I\right)^{-1}\right] tr\left[\left(\sum^2 + \gamma I\right)^{-1} U^H bb^H U\right] - N\left[\left(\sum^2 + \gamma I\right)^{-2} U^H bb^H U\right] = 0, \quad (14)$$

where tr(.) denotes the matrix trace, I is the identity matrix, $U \in \mathbb{C}^{N \times N}$ and $\Sigma = \mathrm{diag}[\sigma_1, \sigma_2, \ldots \sigma_{N-1}, 0]^T$, with $\sigma_1 > \sigma_2 > \ldots > \sigma_{N-1}$ are obtained from the following singular value decomposition (SVD) of A $$A = U \Sigma V^H, \quad (15)$$

where $V \in \mathbb{C}^{N-1 \times N}$.

Equation (14) is known as bounded perturbation regularization (BPR) equation. The regularization parameter values that solve equation (14) minimize the MSE of the RLS.

The introduction of the regularization term in equation (12) aims at providing stability against the ill-conditioning of the matrix A. To reap the full benefit of the regularization process, the regularization parameter $\gamma$ is adjusted carefully. The process of setting the regularization parameter may be performed independently at each time point. However, applying such methods repetitively at each time point may result in unnecessarily increasing the computational complexity of the system. Therefore, the following description presents a method to effectively adjust the regularization parameter needed in Equation (12) with significantly reduced computational complexity.

Newton's method, also known as the Newton-Raphson method, is a well-known technique used to find a root of a function. Starting from an initial guess $\gamma^{i=0}$ for the root of Equation (14), the following iterations are carried out:

$$\gamma^{i+1} = \gamma^i - \frac{f(\gamma^i)}{f'(\gamma^i)}. \quad (16)$$

where $f'(\gamma^i)$ is the derivative of the function. The iterations stop when $|f(\gamma^{i+1})|<\epsilon$.

The present exemplary technique focuses on a situation that guarantees the existence of a unique solution for Equation (14). It is shown that a unique root exists in the interval $(-\sigma_N, \infty)$ if the following sufficient condition is met:

$$Ntr(\Sigma^2 U^H bb^H U) > tr(\Sigma^2) tr(U^H bb^H U) \qquad (17)$$

If $f(\gamma)$ has a positive root, $\gamma^+$, and the condition (17) is satisfied, the following two results are valid:
1) $f(\gamma)$ is always negative in the interval $[0, \gamma^+]$, i.e., $f(\gamma) \leq 0$ for $[0, \gamma^+]$
2) $f(\gamma)$ is an increasing function in the interval $[0, \gamma^+]$, i.e., $f'(\gamma) \geq 0$ for $[0, \gamma^+]$ Thus, using an initial value $\gamma^0$ in the interval $(0, \gamma^+]$, equation (16) can produce a progressively increasing estimate of $\gamma$. Convergence of equation (16) occurs when $\gamma^{i+1} \to \gamma^+$; thus, $f(\gamma^i) \to 0$ and $\gamma^{i+1} \to \gamma^i$.

In the moving source beamforming scenario, data is collected by a sliding window that allows only the newest snapshot to enter and the oldest one to leave the window. Hence, a slight change in $\gamma^+$ is expected for each new sliding window. However, starting from $\gamma^0 = \delta$, where $\delta$ is a small positive value, each new sliding window would increase the number of iterations that are required for $f(\gamma)$ to converge to a positive root.

Figure 3:
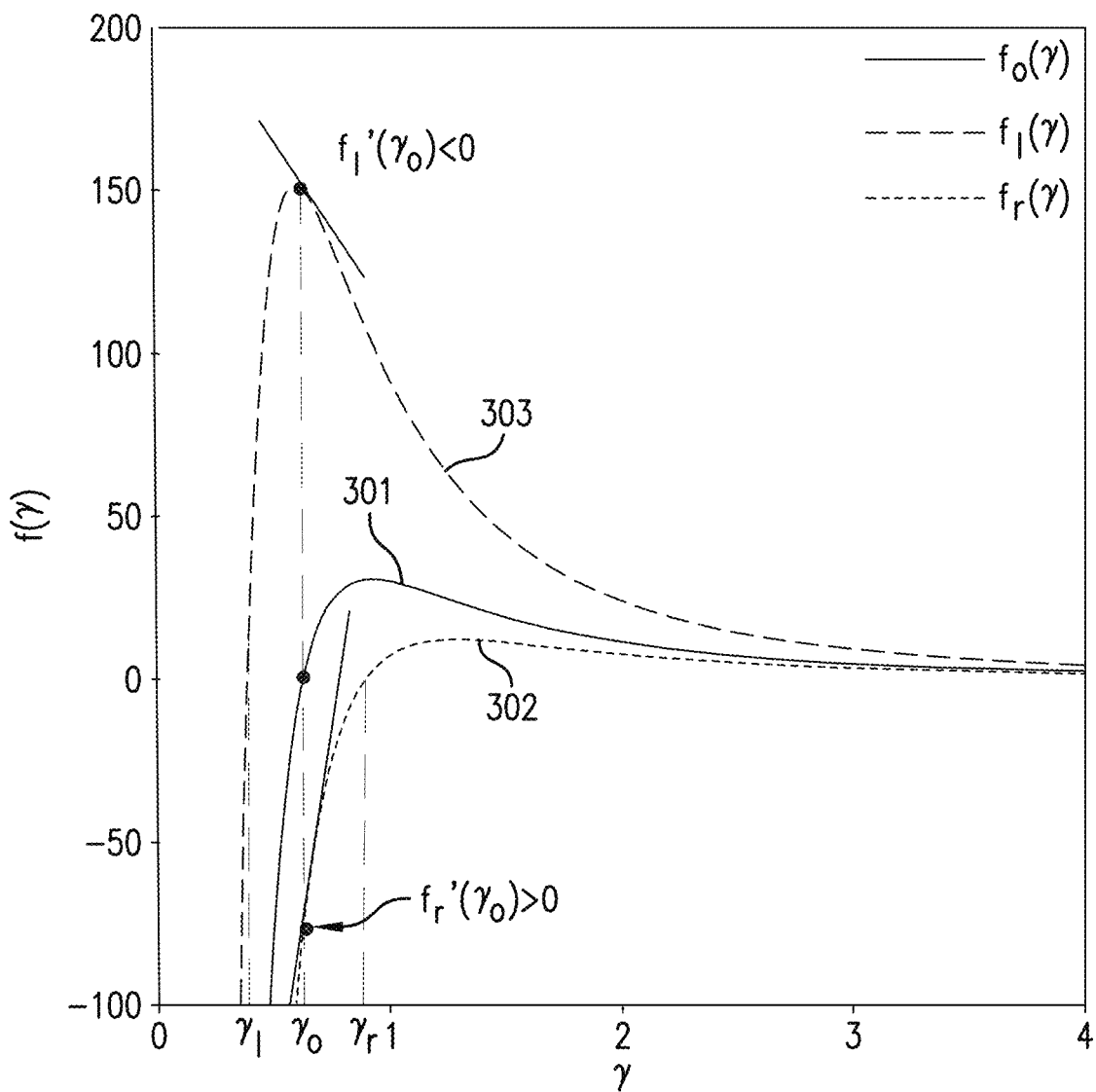
FIG. 3 is a bounded perturbation regularization (BPR) function.

Assume that the root of the current sliding window is $\gamma_0^+$. The root of the next sliding window is either $\gamma_r^+$, where $\gamma_r^+ > \gamma_0^+$, or $\gamma_1^+$, where $\gamma_1^+ < \gamma_0^+$. FIG. 3 plots Equation (14) with these possibilities. Assume the solid curve 301, $f_0(\gamma)$, is equation (14) calculated from the data covariance matrix which is estimated from the current sliding window. Using Newton's method, find the root of $f_o(\gamma)$ with an initial guess ($\gamma^{i=0}\delta$) to obtain the root, $\gamma_0^+$. If the next sliding window plots the dashed curve 302, $f_r(\gamma)$, there is no need to initialize with $\gamma^{i=0} = \delta$ when using Newton's method. Instead, examine the derivative, $f'_r(\gamma)$ at the previous root, $\gamma_o^+$. Since $f'_r(\gamma_o^+) > 0$ this implies that $\gamma_o$ is a suitable initialization point for $f'_r(\gamma)$ to find its root because $\gamma_o^+$ lies in the interval $(0, \gamma_r^+]$.

If the next sliding window moves to the left from $f_o(\gamma)$, it produces the dashed curve 303, $f_1(\gamma)$. In this case, testing $f'_1(\gamma)$ at $\gamma_o^+$ reveals a negative sign which implies that $\gamma_o^+$ is not in the interval $(0, \gamma_1^+]$. For this scenario, bisect the interval $(0, \gamma_0^+)$ and test the sign at $\gamma_0^+/2$. If the result is a positive sign, $\gamma_0^+/2$ is useable as an initialization value for finding the root of $f_1(\gamma)$. Otherwise, repeat bisecting and testing process until a positive sign is obtained. Algorithm 1 summarizes the proposed initialization method:
Algorithm 1: Moving-source Beamformer (BPR-MSB)
Input: U, Σ, a, N
Output: $\gamma^+$
Initialization: $\gamma_o = 1 \times 10^{-4}$
1: Solve Equation (14) using Newton's method.
For the next new snapshot
2: $\gamma_i = \gamma^+$
3: while $f'(\gamma_i) < 0$ do
4: $\gamma_i = \gamma_i/2$
5: if $f'(\gamma_i) > 0$ then
6: break
7: end if
8: end while
9: Solve Equation (14) using Newton's method.
10: return $\gamma^+ = \gamma_i$ To further reduce the complexity, notice that the SVD of A is needed to find a root $\gamma^+$ in Equation (14). However, repeating the SVD increases the complexity of the system. A different approach may be used to carry out the calculations efficiently. As explained earlier, calculate A from the blocking matrix, B, and the estimated covariance matrix, $\hat{R}$. Since $\hat{R}$ is a positive semidefinite matrix, the eigenvalue decomposition (EVD) is useable as follows:

$$\hat{R} = LSL^H, \qquad (18)$$

where $L \in \mathbb{C}^{N \times N}$ and $S = \text{diag}\ [s_1, s_2, \ldots s_N]^T$, with $s_1 > s_2 > \ldots > s_N$. Choose an arbitrary matrix, $M \in \mathbb{C}^{(N-1) \times N}$ such that $B = LM^H$, or $$M^H = L^H B. \qquad (19)$$

Now we can write A differently as follows:

$$\begin{aligned}
A &= \hat{R}^{\frac{1}{2}} B \\
&= LS^{\frac{1}{2}} L^H LM^H \\
&= LS^{\frac{1}{2}} M^H
\end{aligned} \qquad (20)$$

Comparing with Equation (15), notice $$L = U, S^{\frac{1}{2}} = \Sigma, M = V.$$

For each sliding window, modify $\hat{R}$ by adding a rank-1 matrix and subtracting a rank-1 matrix. This allows the use of a recursive algorithm to compute the eigenvalues and eigenvectors of $\hat{R}$ and use them directly in Equation (14). This reduces the complexity by an order of magnitude from $O(N^3)$ to $O(N^2)$. A suitable recursive algorithm for this purpose is described in K.-B. Yu, "Recursive updating the eigenvalue decomposition of a covariance matrix," IEEE Transactions on Signal Processing, vol. 39, no. 5, pp. 1136-1145, 1991.

Example

Signal-to-interference and noise ratio (SINR) is considered for performance evaluation, which is calculated as follows:

$$SINR_t = \frac{\sigma_S^2[t] |w_t^H a_o[t]|^2}{w_t^H R_{i+n} w_t}, \qquad (21)$$

where $\sigma_s[t]$ is the moving source signal power at time t, $a_o[t]$ is the actual steering vector of the desired signal at time t, and $R_{i+n}[t]$ is the interference-plus-noise covariance matrix.

Assume a ULA of N=10 elements that receives an RF signal transmitted by a moving source that starts at 0° and stops at 60°. The speed of the source is set at high ($\omega = 10^5$ rad/sec) to speed up simulation time. During the movement of the source, the signal's amplitude suffers up to 20% attenuation. There are four interference signals (Q=4) located at fixed positions. [−30°, 60°, 100°, 120°] with an interference-to-noise-ratio (INR) of 10 dB. The snapshots are collected in a sliding window of size K=10. Assume that the DOA of the source that coincides with each snapshot is known with a uniformly distributed uncertainty in the interval [−1°,1°]. The desired signal and the interference signals are Gaussian randomly generated data. This Example considers two cases with a signal-to-noise ratio (SNR) equal to 10 dB and 20 dB at θ=0°. The signal power decays progressively in time.

Figure 4:
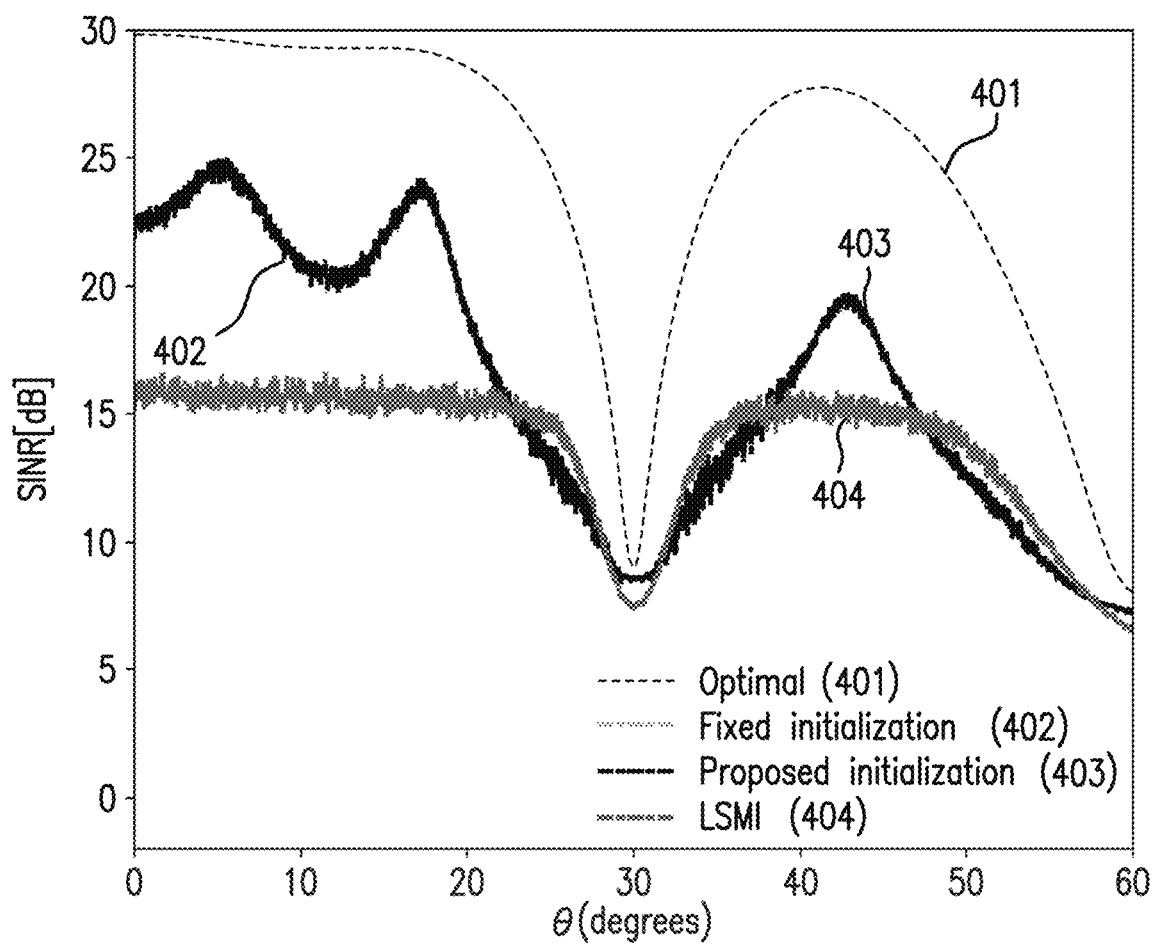
FIG. 4 shows beamforming performance, where SNR=10 dB at $\theta=0°$.

FIG. 4 shows a performance comparison of SINR at SNR=10 dB (at θ=0°) for the exemplary method of this disclosure (curve 402), a fixed initialization method (curve 403), and the loaded sample matrix inversion (LSMI) method (curve 404). Curve 401 shows an optimal result. The fixed initialization method is disclosed in T. Ballal, M. A. Suliman, and T. Y. Al-Naffouri, "Bounded perturbation regularization for linear least squares estimation," IEEE Access, vol. 5, pp. 27 551-27 562, 2017. The LSMI method is disclosed in V. V. Zaharov, "Smart antenna beamforming algorithm for mobile communications with high speed moving sources," in 2008 IEEE Radio and Wireless Symposium. IEEE, 2008, pp. 279-282.

Both the present disclosure's method and fixed initialization method dynamically update their diagonal loading during the movement. LSMI method uses a fixed diagonal loading $\gamma_{FL}$=10 dB. It can be seen that both the present disclosure's method and the fixed initialization method noticeably outperform LSMI in the range (0°, 20°) and around 45°.

Figure 5:
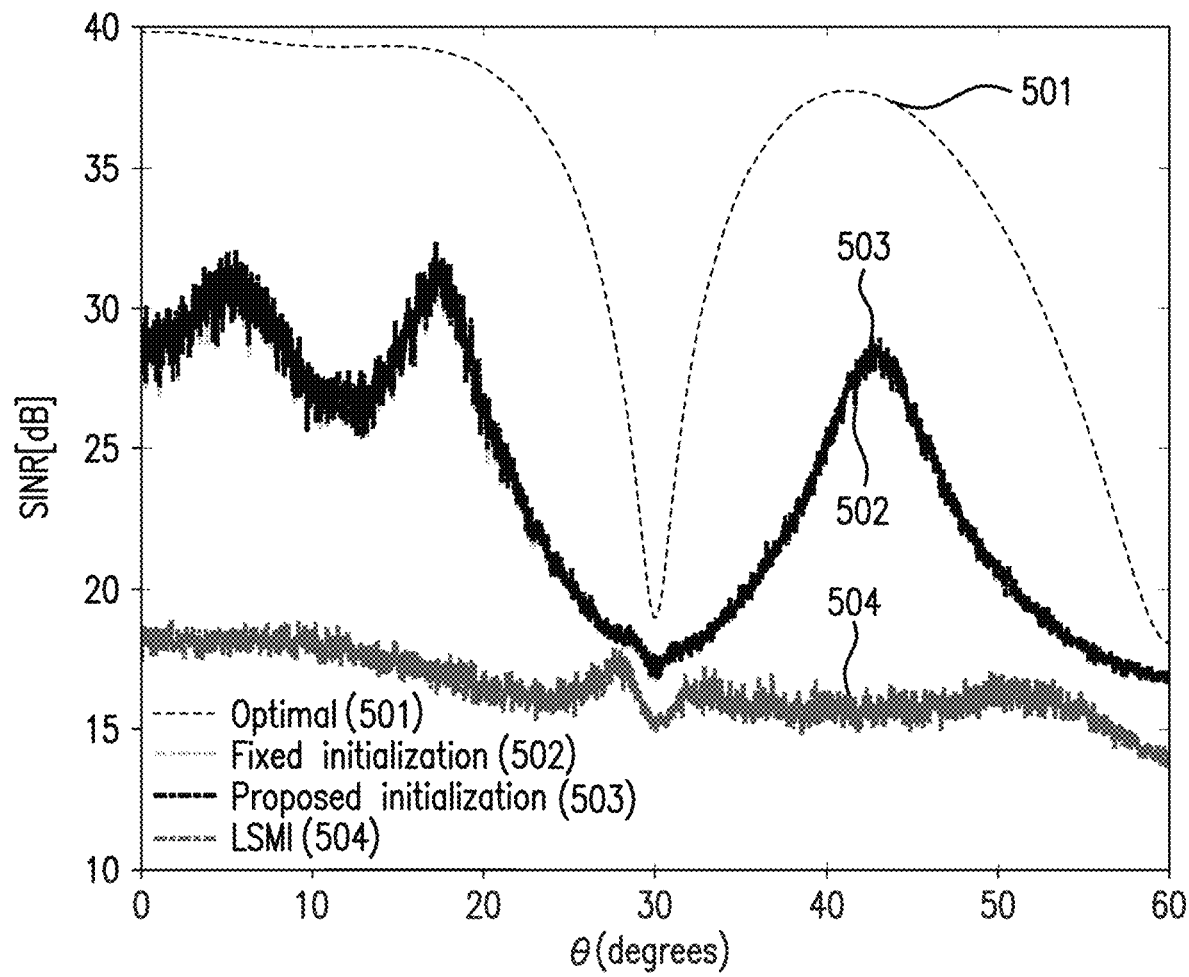
FIG. 5 shows beamforming performance, where SNR=20 dB at $\theta=0°$.

FIG. 5 shows the same SINR comparison as FIG. 4 except in this instance SNR=20 dB at θ=0°. It can be seen that both the present disclosure's method (curve 502) and the fixed method (curve 503), with continuously updated regularization parameters, outperform the LSMI method (curve 504) over the entire range. The optimal result is given by curve 501.

The results show the benefit of continuously updating the diagonal loading parameter. FIGS. 4 and 5 show the performance of the present disclosure's method is matching the fixed initialization method performance because they solve equation (14) for the same γ. However, the initialization method of the present disclosure can save around 75% of the runtime.

Figure 6A:
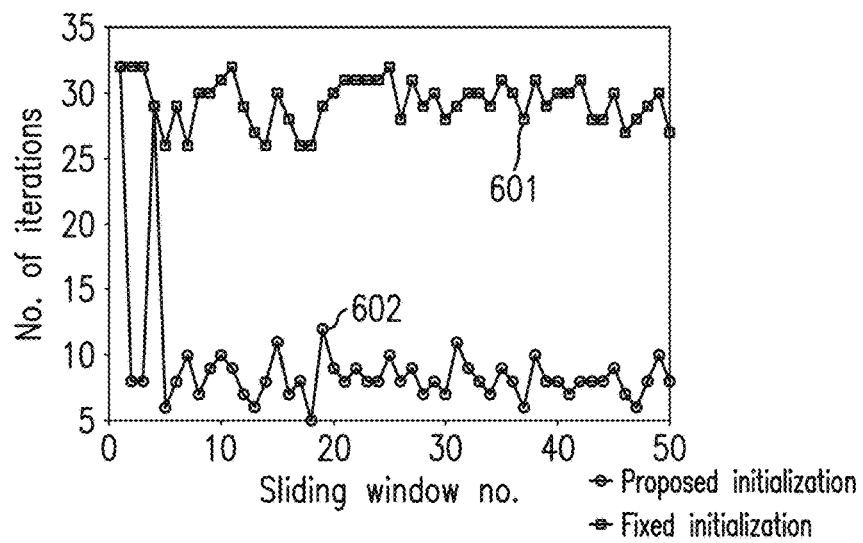
FIG. 6A shows complexity comparison for number of iterations.

FIG. 6A illustrates complexity comparison in terms of the number of iterations between the fixed initialization method and the exemplary initialization method of this disclosure over 50 sliding windows. The values for the fixed initialization method are indicated at 601. The values for the exemplary initialization of this disclosure are indicated at 602. It is clear that using the exemplary technique of this disclosure saves a lot of iterations required to converge to the desired value of the regularization parameter.

Figure 6B:
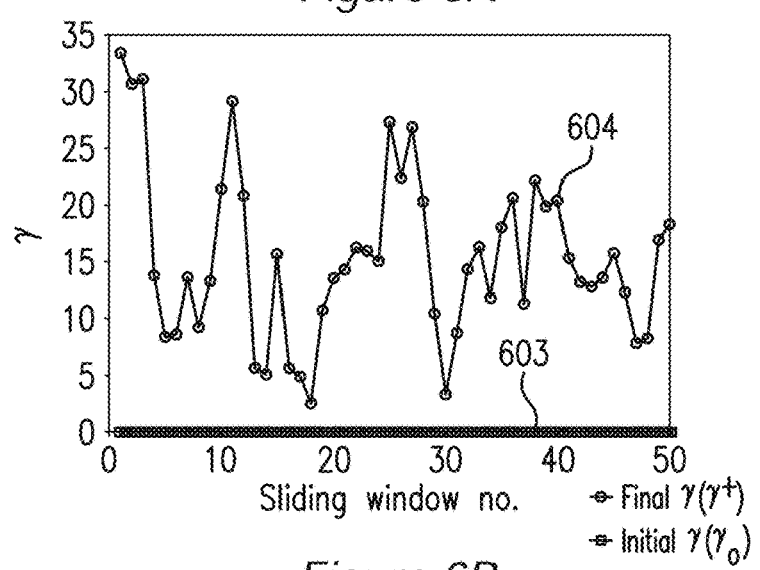
FIG. 6B shows regularization parameter values for a fixed initialization method.
Figure 6C:
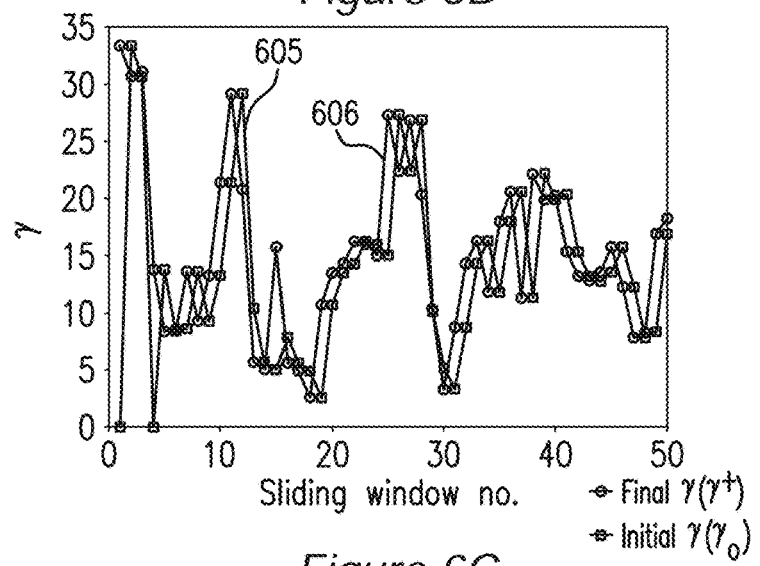
FIG. 6C shows regularization parameter values for exemplary initialization according to the procedures of this disclosure.

FIGS. 6B and 6C compare the initial values of the regularization parameter with its final values (roots) that are obtained using the fixed initialization and the exemplary initialization methods, respectively. FIG. 6B shows the initial values 603 and final values 604 for the fixed initialization method. FIG. 6C shows the initial values 605 and the final values 606 for the exemplary initialization method of this disclosure. It can be seen that, contrary to fixed initialization, the initial values of the exemplary technique are very close to their final values. This explains why the exemplary technique saves a lot of iterations.

Figure 7:
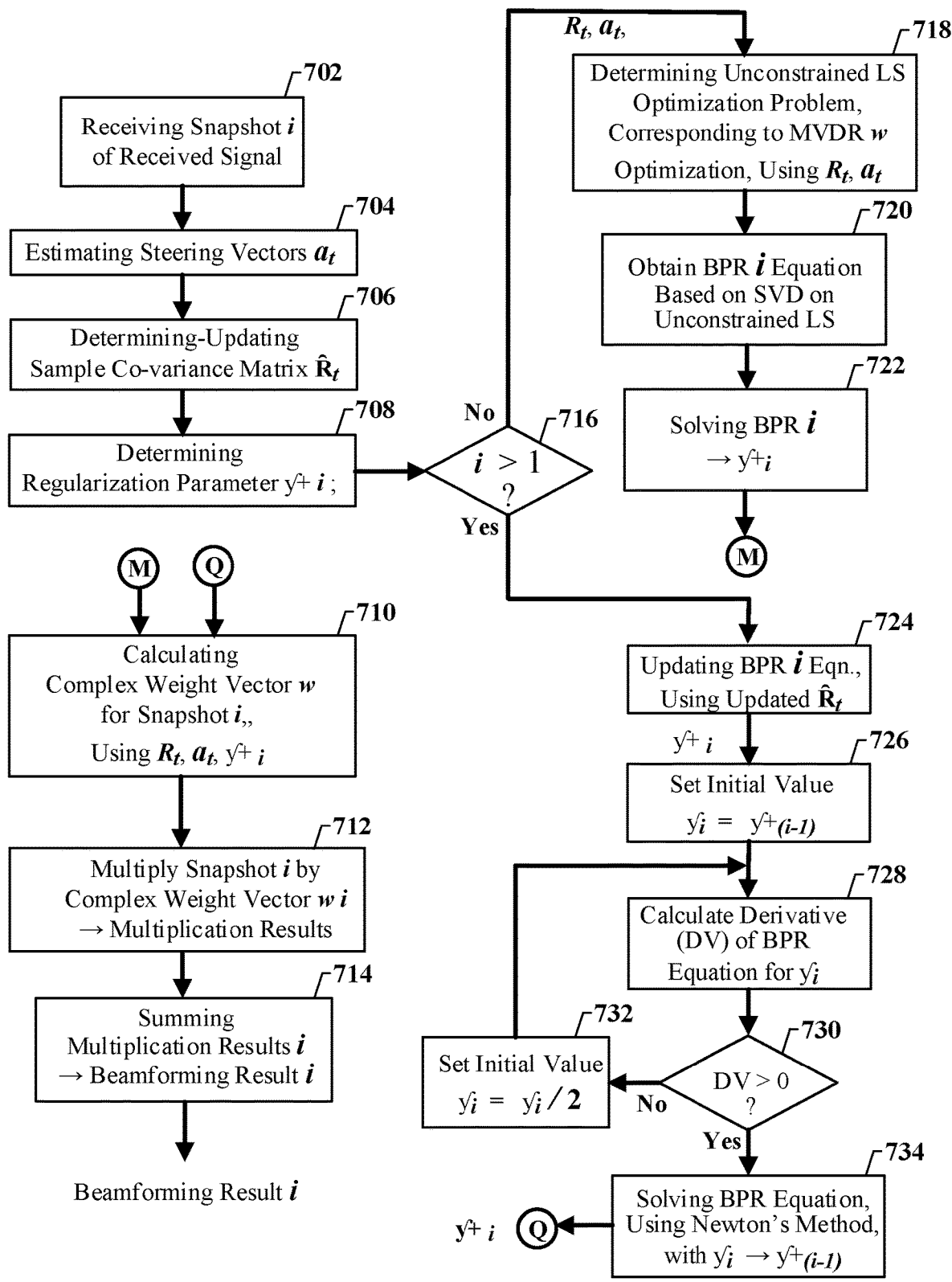
FIG. 7 shows a block diagram of example operations in a reduced complexity beamforming process in accordance with this disclosure.

An instance of the FIG. 7 process includes receiving 702, from an array of antenna elements, snapshots i of received signal, perform the process and outputting, as 703, corresponding beam-forming results i. As described above, the received signal is a composite of a desired signal and undesired signals. Processing steps in outputting each beam-forming result i include estimating 704 steering vectors $a_t$ of the desired signal and the undesired signals, determining 706 a sample covariance matrix $\hat{R}_t$ or updating the sample covariance matrix $\hat{R}_t$ from data of the received signal, and determining 708 a regularization parameter $\gamma_i^+$ for snapshot i. Steps also include automatically determining 710 a complex weight vector w for snapshot i, using the regularization parameter $\gamma_i^+$, the sample covariance matrix $\hat{R}_t$, and the steering vector $a_t$, multiplying 712 the snapshot i with the complex weight vector w, producing multiplication results; and outputting 714, as the beam-forming result I 703, a sum of the multiplication results of the multiplying step. As described above, the 716 routing of processing steps in determining the regularization parameter $\gamma_1^+$ for the first snapshot include determining 718 an unconstrained least-squares (LS) optimization problem, corresponding to a generalized sidelobe canceller (GSC) reformulation of a weighting vector optimization problem that uses the sample covariance matrix $\hat{R}_t$ and the steering vectors $a_t$. Step further include obtaining 720 a bounded perturbation regularization (BPR) equation, by operations that include performing a singular value decomposition (SVD) on the unconstrained LS optimization problem, obtaining 722 the regularization parameter $\gamma_1^+$ via solving the BPR equation. Processing steps in determining the regularization parameter $\gamma_i^+$ for each subsequent snapshot i after the first snapshot (i=1) include updating 724 the BPR equation, using the sample covariance matrix $\hat{R}_t$, and setting 726 $\gamma_i$ at $\gamma_{i-1}^+$. Operations further include calculating 728 the derivative of the BPR equation for $\gamma_i$, and if 730 the derivative of the BPR equation for $\gamma_i$ is negative, repeatedly dividing 732 $\gamma_i$ in half until the derivative of the BPR equation for $\gamma_i$ is positive, and solving the BPR equation 734 for the regularization parameter $\gamma_i^+$ for the snapshot i, using Newton's method with $\gamma_i$.

Some embodiments of the present invention may be a system, a device, a method, and/or a computer program product. A system, device, or computer program product may include a computer readable storage medium (or media) having computer readable program instructions thereon for causing one or more processors to carry out aspects of the present invention, e.g., processes or parts of processes or a combination of processes described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Processes described herein, or steps thereof, may be embodied in computer readable program instructions which may be paired with or downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions and in various combinations.

These computer readable program instructions may be provided to one or more processors of one or more general purpose computers, special purpose computers, or other programmable data processing apparatuses to produce a machine or system, such that the instructions, which execute via the processor(s) of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described herein in connection with exemplary embodiments and features, one skilled in the art will recognize that the invention is not limited by the disclosure and that various changes and modifications may be made without departing from the scope of the invention as defined by the appended claims.

Acknowledgement

The inventors extend their appreciation to the Deputyship for Research & Innovation, Ministry of Education in Saudi Arabia, for funding this research work through project number (2020-055) and King Abdulaziz University, DSR Saudi Arabia.

What is claimed is:

1. A computerized, low-computation complexity beamforming method for radio frequency (RF) sources that are moving, comprising signal processing steps, by a digital signal processing (DSP) unit, of:

receiving, from an array of antenna elements, snapshots i of received signal and outputting corresponding beamforming results i, wherein the received signal is a composite of a desired signal and undesired signals, and wherein processing steps in outputting each beamforming result i include:

estimating steering vectors $a_t$ of the desired signal and the undesired signals, determining a sample covariance matrix $\hat{R}_t$ or updating the sample covariance matrix $\hat{R}_t$ from data of the received signal, determining a regularization parameter $\gamma_i^+$ for snapshot i, automatically determining a complex weight vector w for snapshot i, using the regularization parameter $\gamma_i^+$, the sample covariance matrix $\hat{R}_t$, and the steering vector $a_t$, multiplying the snapshot i with the complex weight vector w, producing multiplication results; and outputting, as the beamforming result i, a sum of the multiplication results of the multiplying step, wherein processing steps in determining the regularization parameter $\gamma_1^+$ for a first snapshot include
- determining an unconstrained least-squares (LS) optimization problem, corresponding to a generalized sidelobe canceller (GSC) reformulation of a weighting vector optimization problem that uses the sample covariance matrix $\hat{R}_t$ and the steering vectors $a_t$,
- obtaining a bounded perturbation regularization (BPR) equation, by operations that include performing a singular value decomposition (SVD) on the unconstrained LS optimization problem,
- obtaining the regularization parameter $\gamma_1^+$ via solving the BPR equation, wherein processing steps in determining the regularization parameter $\gamma_i^+$ for each subsequent snapshot i after the first snapshot (i=1) include
- updating the BPR equation, using the sample covariance matrix $\hat{R}_t$
- setting $\gamma_i = \gamma_{i-1}^+$,
- calculating the derivative of the BPR equation for $\gamma_i$, and if the derivative of the BPR equation for $\gamma_i$ is negative, repeatedly dividing $\gamma_i$ in half until a derivative of the BPR equation for $\gamma_i$ is positive, and
- solving the BPR equation for the regularization parameter $\gamma_i^+$ for the snapshot i, using Newton's method with $\gamma_i$.

2. The beamforming method of claim 1, wherein solving the BPR equation for the first snapshot, for obtaining the regularization parameter $\gamma_1^+$ for the first snap-shot, includes a process using Newton's method.

3. A beamforming instrument for computerized, low-computation complexity beamforming of reception from radio frequency (RF) sources that are moving, comprising
- an antenna array for receiving snapshots i of received signal, wherein the received signal is a composite of a desired signal and undesired signals; and
- a digital signal processing (DSP) unit configured for receiving, from the array of antenna elements, the snapshots i and outputting corresponding beamforming results i, wherein DSP unit processing steps for each beamforming result i include:
  - estimating steering vectors $a_t$ of the desired signal and the undesired signals,
  - determining a sample covariance matrix $\hat{R}_t$ or updating the sample covariance matrix $\hat{R}_t$ from data of the received signal,
  - automatically determining a complex weight vector w for snapshot i, using the regularization parameter $\gamma_1^+$, the sample covariance matrix $\hat{R}_t$, and the steering vector $a_t$,
  - multiplying the snapshot i with the complex weight vector w, generating multiplication results; and
  - outputting, as the beamforming result i, a sum of the multiplication results of the multiplying step, wherein processing steps in determining the regularization parameter $\gamma_1^+$ for a first snapshot include
- determining an unconstrained least-squares (LS) optimization problem, corresponding to a generalized sidelobe canceller (GSC) reformulation of a minimum variance distortionless response (MVDR) weighting vector optimization problem that uses the sample covariance matrix $\hat{R}_t$ and the steering vectors $a_t$,
- obtaining a bounded perturbation regularization (BPR) equation, by operations that include performing a singular value decomposition (SVD) on the unconstrained LS optimization problem
- obtaining the regularization parameter $\gamma_1^+$ via solving the BPR equation, wherein the processing steps in determining the regularization parameter $\gamma_i^+$ for each subsequent snapshot i after the first snapshot (i=1) include
- updating the sample covariance matrix $\hat{R}_t$, using the snapshot i, and updating the BPR equation, using the sample covariance matrix $\hat{R}_t$,
- setting $\gamma_i = \gamma_{i-1}^+$,
- calculating the derivative of the BPR equation for $\gamma_i$ and, if a derivative of the BPR equation for $\gamma_i$ is negative, repeatedly dividing $\gamma_i$ in half until the derivative of the BPR equation for $\gamma_i$ is positive, and
- solving the BPR equation for the regularization parameter $\gamma_i^+$ for the snapshot i, using Newton's method with $\gamma_i$.

4. The beamforming instrument of claim 3, wherein solving the BPR equation for the first snapshot, for obtaining the regularization parameter $\gamma_1^+$ for the first snapshot, includes a process using Newton's method.

* * * * *